US010933482B2

(12) United States Patent
Kato et al.

(10) Patent No.: US 10,933,482 B2
(45) Date of Patent: Mar. 2, 2021

(54) SOLDERING METHOD AND SOLDERING STRUCTURE

(71) Applicant: Yazaki Corporation, Tokyo (JP)

(72) Inventors: Akio Kato, Makinohara (JP); Shinpei Kato, Makinohara (JP); Hisashi Karube, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 286 days.

(21) Appl. No.: 15/952,694

(22) Filed: Apr. 13, 2018

(65) Prior Publication Data

US 2018/0361491 A1 Dec. 20, 2018

(30) Foreign Application Priority Data

Jun. 20, 2017 (JP) .............................. JP2017-120306

(51) Int. Cl.
| B23K 1/00 | (2006.01) |
| B23K 1/20 | (2006.01) |
| H01R 43/02 | (2006.01) |
| H01R 4/02 | (2006.01) |
| H01R 13/58 | (2006.01) |

(52) U.S. Cl.
CPC .............. B23K 1/20 (2013.01); B23K 1/0016 (2013.01); H01R 4/028 (2013.01); H01R 43/0235 (2013.01); *H01R 4/024* (2013.01); *H01R 13/5833* (2013.01); *H01R 43/0263* (2013.01)

(58) Field of Classification Search
CPC ..... B23K 1/0016; B23K 1/20; B23K 2101/38
See application file for complete search history.

(56) References Cited

U.S. PATENT DOCUMENTS

2002/0088841 A1* 7/2002 Li .................. B23K 1/0008
228/245
2017/0040874 A1* 2/2017 Han .................. G01D 11/30

FOREIGN PATENT DOCUMENTS

| JP | 5286664 U | 12/1975 |
| JP | 5175971 A | 6/1976 |
| JP | 53136178 U | 3/1977 |
| JP | 2001167639 A | * 6/2001 |
| JP | 2003080365 A | 3/2003 |
| JP | 2014-163880 A | 9/2014 |

OTHER PUBLICATIONS

JP2003-080365A1 computer english translation (Year: 2003).*
JP-2001167639—A computer English translation (Year: 2001).*
Notice of Reasons for Refusal dated May 14, 2019 from the Japanese Patent Office in application No. 2017-120306.

* cited by examiner

Primary Examiner — Erin B Saad
(74) Attorney, Agent, or Firm — Sughrue Mion, PLLC

(57) ABSTRACT

Provided is a soldering method for soldering a tip end of an electric wire to a soldering portion of a metallic terminal which allows the soldering to be performed with excellent workability. The method includes a damming structure forming step forming a damming structure at a periphery of the soldering portion to dam a solder which is supplied in a molten state with a flux to the soldering portion to keep the solder at the soldering portion, an electric wire setting step setting the tip end of the electric wire at the soldering portion ready for soldering, and a solder supplying step supplying the solder in the molten state with the flux to the soldering portion to perform the soldering.

11 Claims, 8 Drawing Sheets

SOLDERING METHOD AND SOLDERING STRUCTURE

CROSS REFERENCE TO RELATED APPLICATION

The priority application Japanese Patent Application No. 2017-120306 upon which this patent application is based is hereby incorporated by reference.

BACKGROUND OF THE INVENTION

Field of the Invention

The present disclosure relates to a soldering method and a soldering structure for soldering a tip end of an electric wire to a soldering portion of a metallic terminal.

Description of the Related Art

A variety of electrical devices having a metallic terminal to which an electric wire is to be soldered are conventionally known. An example of such electrical devices is shown in Japanese Patent Application Publication No. 2014-163880, which discloses a fluid level sensor for detecting a fluid level and such of a fuel within a fuel tank of an automobile, for example. This fluid level sensor detects a movement of a magnet connected, via an arm, to a float that moves up and down along with a change in a fluid level, and is provided with a built-in hall IC. Further, the fluid level sensor has a plate-like metallic terminal extending from this hall IC, and a tip end of an electric wire is soldered to a soldering portion on the metallic terminal.

SUMMARY OF THE INVENTION

Some metallic terminals are made corrosion resistant by forming a thick oxide film on a surface thereof. Generally, such oxide film has low solder wettability, causing a decrease in workability of soldering in many cases.

An object of the present invention is to provide a soldering method and a soldering structure which allow the soldering of a tip end of an electric wire to a soldering portion on a metallic terminal to be performed with excellent workability.

To achieve the above-mentioned object, the present invention provides a soldering method for soldering a tip end of an electric wire to a soldering portion of a metallic terminal, the method including a damming structure forming step forming a damming structure at a periphery of the soldering portion to dam a solder which is supplied in a molten state with a flux to the soldering portion to keep the solder at the soldering portion, an electric wire setting step setting the tip end of the electric wire at the soldering portion such that the tip end of the electric wire is ready for soldering, and a solder supplying step supplying the solder in the molten state with the flux to the soldering portion to perform the soldering.

Furthermore, the present invention provides a soldering structure for soldering a tip end of an electric wire to a soldering portion of a metallic terminal, including a solder to be supplied in a molten state with a flux to the soldering portion, and a damming structure formed at a periphery of the soldering portion and configured to dam the solder supplied in the molten state with the flux to the soldering portion to keep the solder at the soldering portion.

According to the soldering method of the present invention, the damming structure formed at the periphery of the soldering portion keeps the flux, that is supplied with the solder, to the soldering portion during the soldering. Since the flux serves to remove the oxide film on the metal surface, by keeping the flux at the soldering portion as described above, the oxide film on the soldering portion can be removed with high removal efficiency. Consequently, even if the metallic terminal includes a thick oxide film to add the corrosion resistance, the oxide film at the soldering portion can be removed by the flux with high removal efficiency, thereby improving the wettability of the solder during the soldering. That is, according to the soldering method of the present invention, the soldering of the core wire of the electric wire to the soldering portion of the metallic terminal can be performed with excellent workability.

According to the soldering structure of the present invention, the flux kept at the soldering portion by the damming structure can remove the oxide film on the soldering portion with high removal efficiency. Consequently, even if the metallic terminal includes a thick oxide film to add the corrosion resistance, the oxide film at the soldering portion can be removed by the flux with high removal efficiency, thereby improving the wettability of the solder during the soldering. That is, according to the soldering structure of the present invention, the soldering of the core wire of the electric wire to the soldering portion of the metallic terminal can be performed with excellent workability.

DETAILED DESCRIPTION OF AN EXEMPLARY EMBODIMENT OF INVENTION

The following will explain an exemplary embodiment of the present invention.

Figure 1:
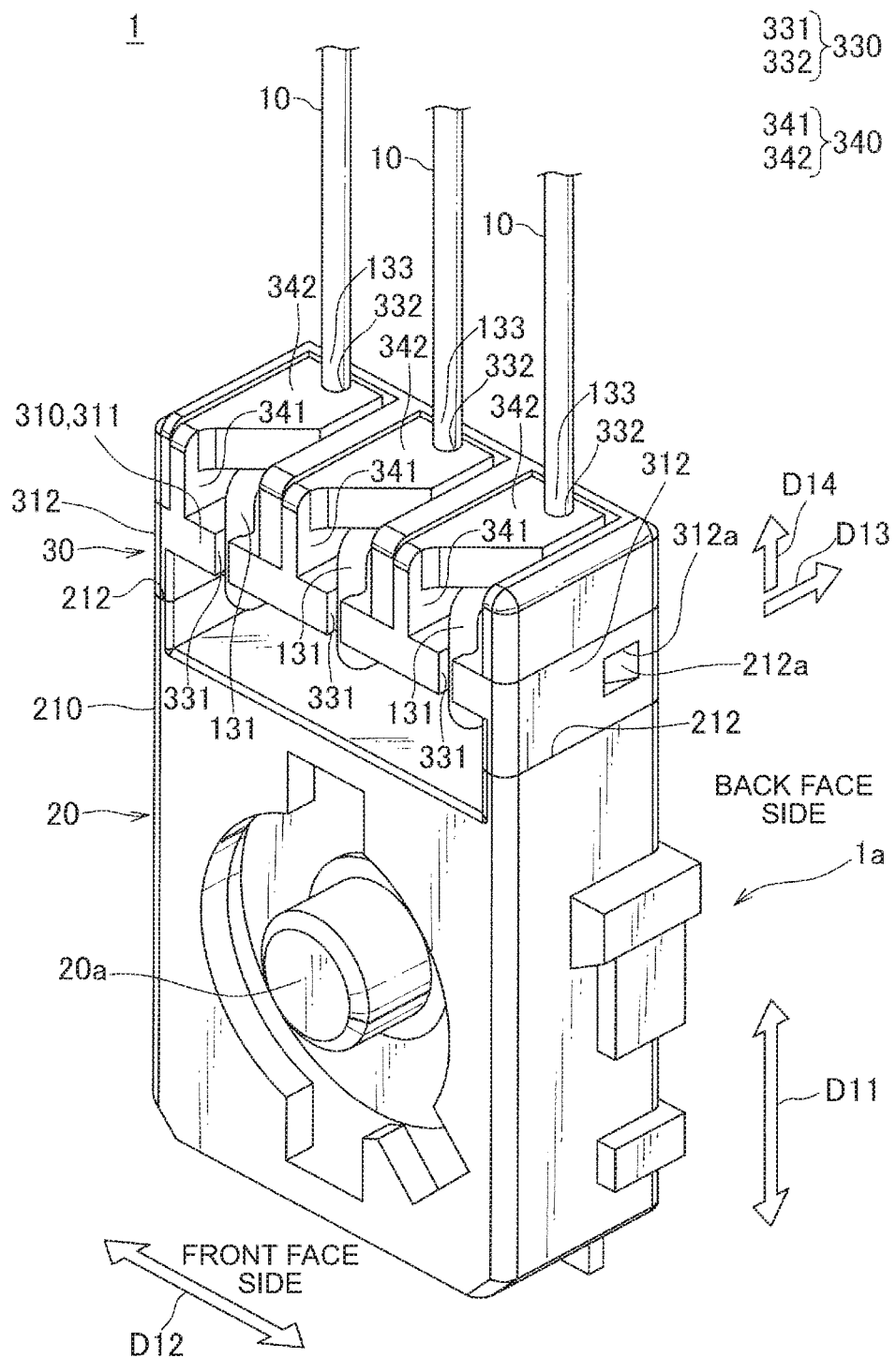
FIG. 1 shows an example of an electrical device applied with one embodiment of the present invention.

FIG. 1 is an illustration showing an example of an electrical device applied with one embodiment of the present invention. FIG. 1 shows a sensor device 1 of a fluid level sensor configured to detect a fluid level and such within a fuel tank of an automobile, for example. The fluid level sensor includes the sensor device 1, a float configured to move up and down along with a change in the fluid level, and a magnet movably attached with respect to the sensor device 1 and connected, via an arm, to the float. Herein, the sensor device 1 of the fluid level sensor is described as one example of an electrical device, and other components of the fluid level sensor including the float and the magnet are omitted in the drawings.

The sensor device 1 shown in FIG. 1 is configured to detect the movement of the magnet connected, via the arm, to the float which moves up and down along with the change in the fluid level, and includes a hall IC built in the sensor device 1. The sensor device 1 includes a device main body 1a having the built-in hall IC and three electric wires 10 respectively electrically connected to this hall IC. The three electric wires 10 are constituted of a grounding wire, a signal wire and a power wire with respect to the hall IC. The connection of the three electric wires 10 to the hall IC is performed via three metallic terminals which are hidden in FIG. 1.

The device main body 1a of the sensor device 1 includes a terminal-side frame 20 holding the metallic terminals, and an electric wire-side frame 30 holding the three electric wires 10 and mounted to the terminal-side frame 20. The hall IC is built into the terminal-side frame 20 having a rectangular box-like shape. In this embodiment, a ring-like magnet is used as the magnet for transmitting the movement of the float. A shaft-like attachment portion 20a is provided on one side of the rectangular box-like shaped terminal-side frame 20, and the ring-like magnet is movably attached to the attachment portion 20a. The hall IC detects an amount of rotation of the magnet (hereinafter called 2 "magnet rotation amount") around the shaft-like attachment portion 20a and outputs a detection result as a signal indicating the fluid level to an outside control device and such via the electric wires 10. Hereinafter, a face of the terminal-side frame 20 on which the shaft-like attachment portion 20a of the magnet is provided is referred to as "front face", and an opposite face is referred to as "back face".

Figure 2:
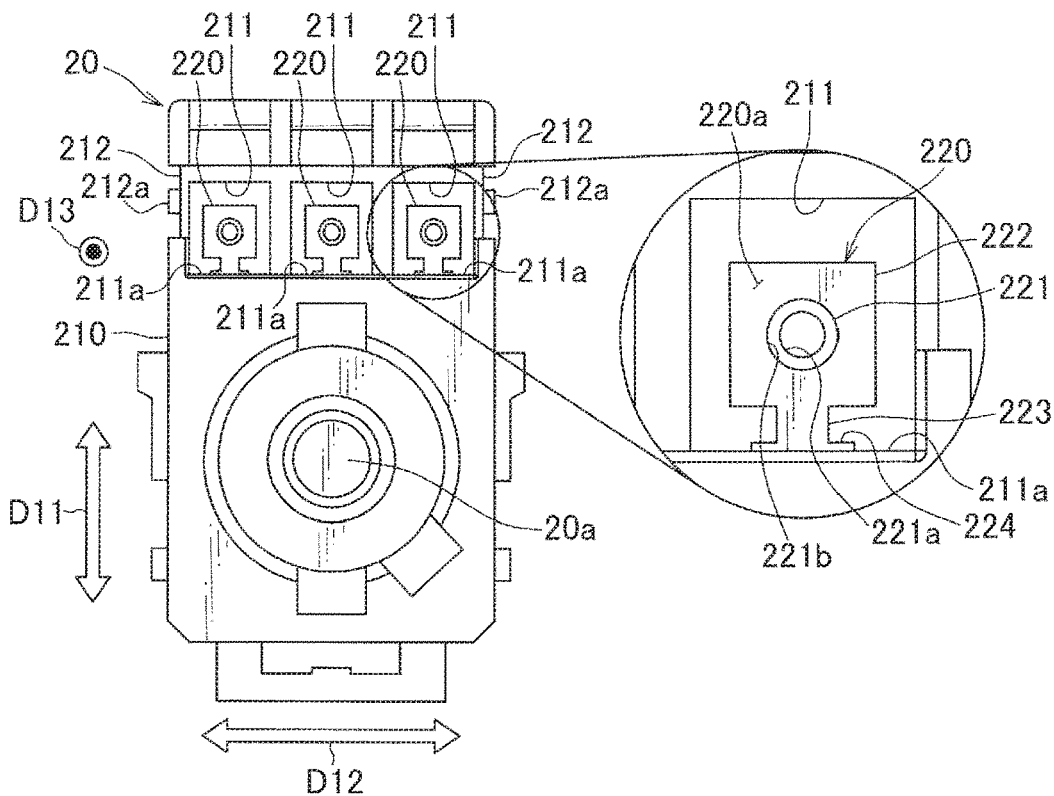
FIG. 2 is a plane view of a terminal-side frame shown in FIG. 1 viewed from front.
Figure 3:
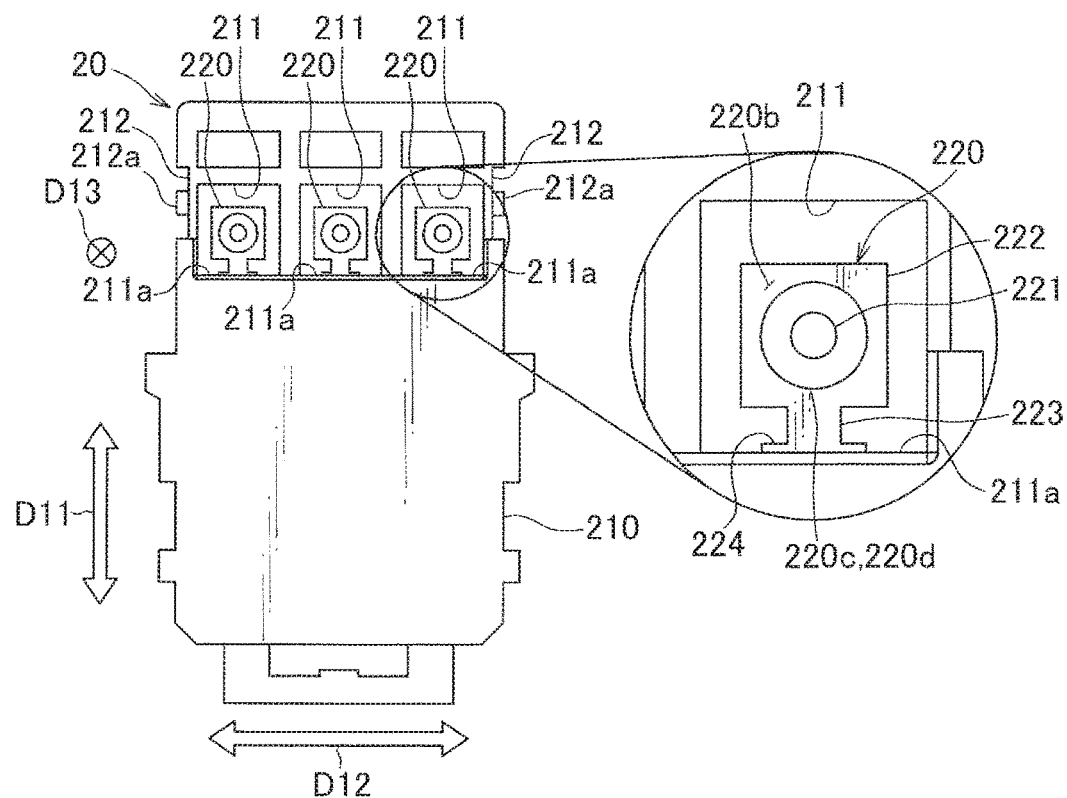
FIG. 3 is a plane view of the terminal-side frame shown in FIG. 1 viewed from back.

FIG. 2 is a plane view of the terminal-side frame shown in FIG. 1 viewed from front, and FIG. 3 is a plane view of the terminal-side frame shown in FIG. 1 viewed from back.

As described above, the terminal-side frame 20 is provided with the shaft-like attachment portion 20a at its front face and the hall IC built therein, and is provided with a frame main body 210 made of resin and formed into a rectangular box-like shape. At one end side of the frame main body 210 in a long side direction D11, three hollow portions 211 are aligned along a short side direction D12. The hollow portion 211 has a rectangular tube-like shape and penetrates through the frame main body 211 in the thickness direction. Furthermore, total of three metallic terminals 220 are provided to the terminal-side frame 20, one metallic terminal 220 being disposed inside the respective hollow portions 211. The each of the electric wires 10 shown in FIG. 1 is connected to each of the metallic terminals 220 by soldering. The electric wire 10 is a covered wire, and a cover at a tip end of the electric wire is removed such that a core wire is soldered to the metallic terminal 220.

In the present embodiment, each metallic terminal 220 is a stainless wire covered by a corrosion-resistant oxide film. Each metallic terminal 220 is a band plate-shaped terminal and one end side (hereinafter, "first end side") of the metallic terminal 220 is connected to the hall IC inside the frame main body 210. The frame main body 210 is formed by insert molding such that the first end sides of the three metallic terminals 220 each connected to the hall IC are built in the frame main body 210. Furthermore, another end side (hereinafter, "second end side") of each of the metallic terminals 220 projects from an inner wall 211a of the hollow portion 211, shown at a lower side in the drawing (FIG. 2), toward inside the hollow portion 211, and is exposed.

The second end side of each of the metallic terminals 220, which is exposed to inside of the hollow portion 211, is constituted of a terminal main body 222 and a constriction portion 223. The terminal main body 222 is provided with a through hole 221 through which the core wire of the electric wire 10 is inserted. The constriction portion 223 extends from the terminal main body 222 in the long side direction D11. The constriction portion 223 is a narrow (small) portion, that is, an area of its cross section orthogonal to its extending direction (i.e., the long side direction D11) is smaller than an area of the cross section of the terminal main body 222 orthogonal to the above-described extending direction. Specifically, the constriction portion 223 is a band-shaped constricted part extending from the terminal main body 222 and having a widthwise dimension in the short side direction D12 smaller than the widthwise dimension of the terminal main body 222.

Furthermore, in the present embodiment, the first end side of each of the metallic terminals 220 which is further extending from the constriction portion 223 is referred to as a to-be-held portion 224 which is built in and held by the frame main body 210 as a holding structure. The to-be-held portion 224 has a widthwise dimension along the short side direction D12 lying between the widthwise dimension of the terminal main body 222 and the widthwise dimension of the constriction portion 223. The to-be-held portion 224 is slightly exposed inside the hollow portion 211, and this exposed portion is continuous with the constriction portion 223.

The terminal main body 222, when viewed from a direction orthogonal to the metallic terminal 220, is formed into a square-like shape in a planar view and is provided with a through hole 221 at nearly a center of the terminal main body 222. The constriction portion 223 is located between the inner wall 211a of the hollow portion 211 and one side of the terminal main body 222 located on the side of the inner wall 211a. The constriction portion 223 has a width, the width that is in a direction orthogonal to a direction from the terminal main body 222 toward the inner wall 211a, that is narrower than the terminal main body 222, as described above.

The electric wire-side frame 30 shown in FIG. 1 is configured to hold three electric wires 10 to be soldered to the metallic terminals 220 and s configured to be mounted to the terminal-side frame 20 from front side shown in FIG. 2 in a mounting direction D13 that is substantially orthogonal to the metallic terminal 220.

Figure 4:
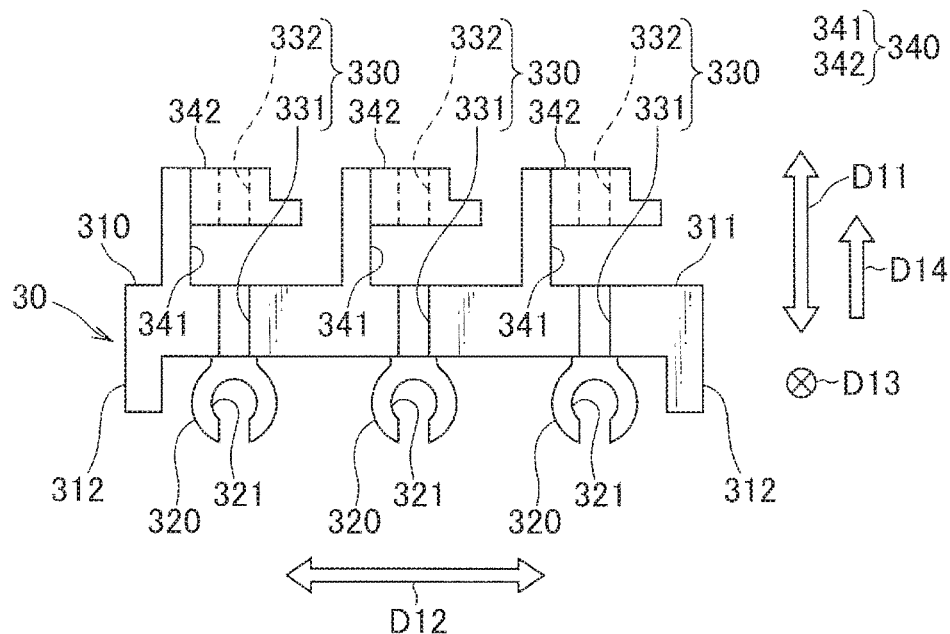
FIG. 4 is a plane view of an electric wire-side frame shown in FIG. 1 viewed from front.
Figure 5:
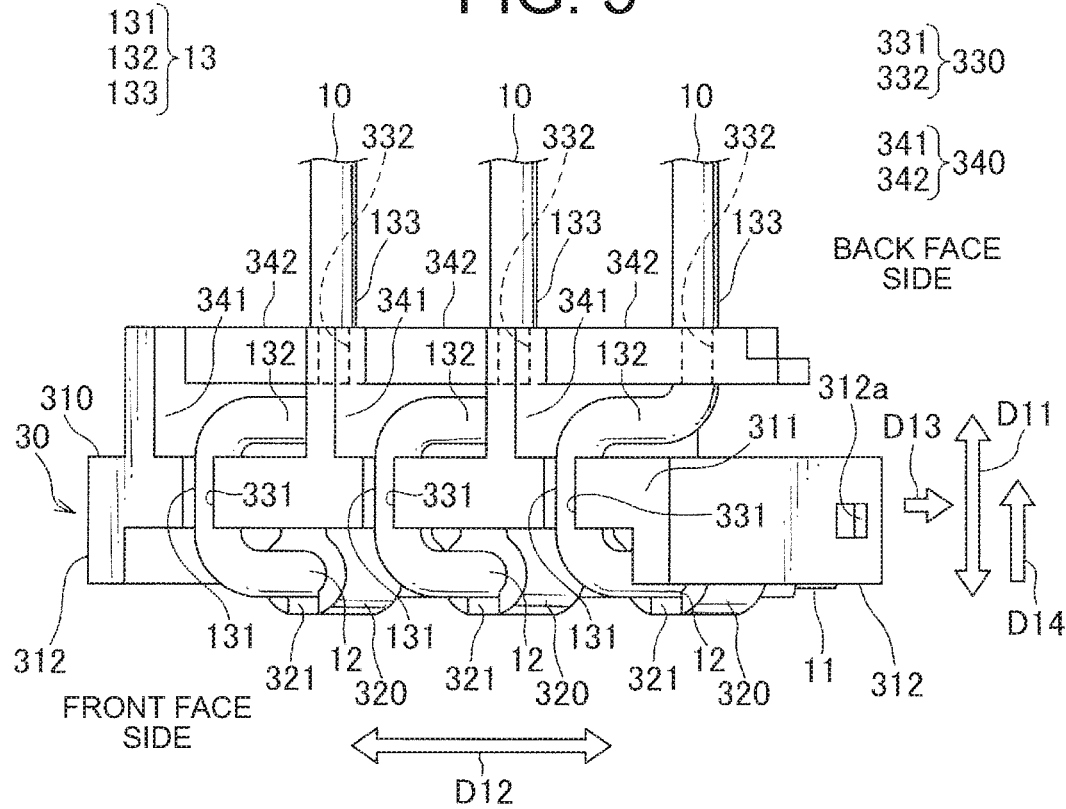
FIG. 5 is a perspective view of the electric wire-side frame shown in FIG. 1 viewed from front.
Figure 6:
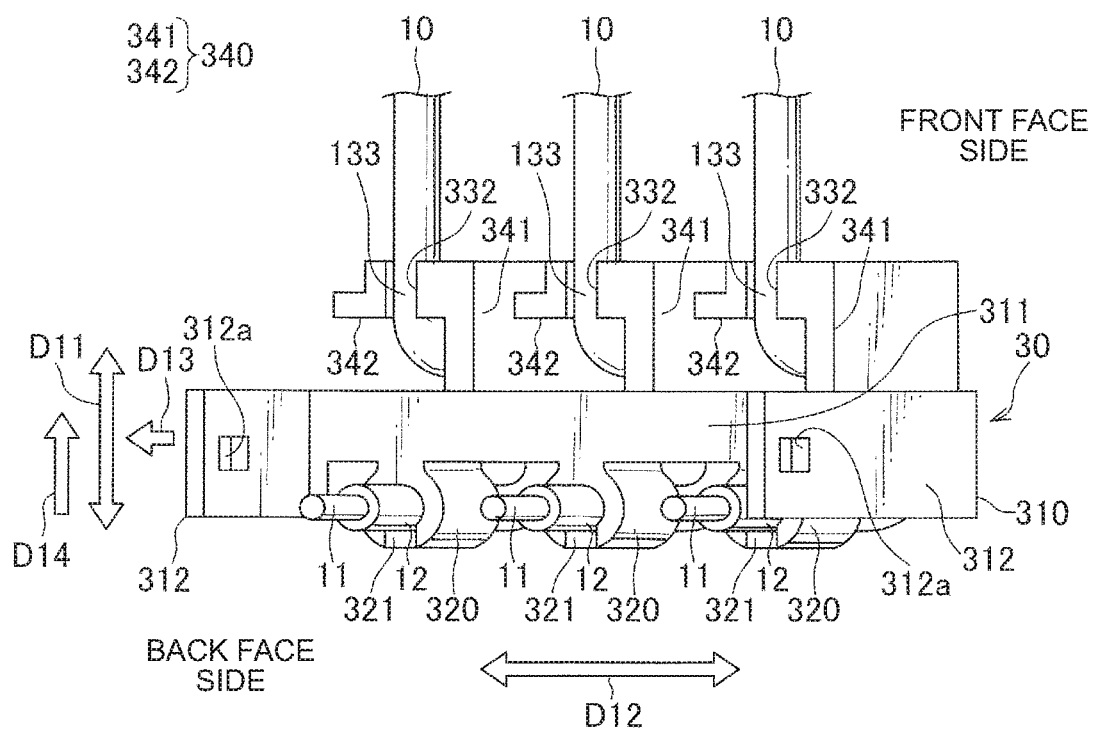
FIG. 6 is a perspective view of the electric wire-side frame shown in FIG. 1 viewed from back.

FIG. 4 is a plane view of the electric wire-side frame 30 shown in FIG. 1 viewed from front side, FIG. 5 is a perspective view of the electric wire-side frame 30 shown in FIG. 1 viewed from front side, and FIG. 6 is a perspective view of the electric wire-side frame 30 shown in FIG. 1 viewed from back side. FIG. 4 shows only the electric wire-side frame 30, and FIG. 5 and FIG. 6 show the electric wire-side frame 30 with three electric wires 10.

The electric wire-side frame 30 includes a frame main body 310 configured to be mounted to and fixed to the terminal-side frame 20. This frame main body 310 includes a transversal beam 311 extending in a short side direction D12 for the frame main body 210 of the terminal-side frame 20 and an opposed pair of arm walls 312 projecting from both ends of the transversal beam 311 and extending in the mounting direction D13 of the electric wire-side frame 30. Each of the arm walls 312 is provided with a locking hole 312a at an edge side of the arm wall 312. Meanwhile, as shown in FIG. 2 and FIG. 3, the frame main body 210 of the terminal-side frame 20 is provided with arm receiving portions 212 each of which is recessed in a shape that can receive (accommodate) the above-described arm wall 312. The arm receiving portions 212 are provided at side faces of the frame main body 210, respectively, so as to be located at portions adjacent to the hollow portions 211 at both right and left ends. A locking claw 212a arranged to be locked onto the locking hole 312a of the arm wall 312 is projecting from bottom of the recess of each arm receiving portion 212.

Once the electric wire-side frame 30 is mounted to the terminal-side frame 20 in the mounting direction D13, the respective arm walls 312 are received in the respective arm receiving portions 212, and the respective locking claws 212a are locked onto the respective locking holes 312a. As a result, the electric wire-side frame 30 is fixed to the terminal-side frame 20. In this fixed state, the transversal beam 311 of the frame main body 310 of the electric wire-side frame 30 traverses upper side of the three metallic terminals 220 aligned as shown in FIG. 2 and FIG. 3. Furthermore, in this fixed state, a front face of the transversal beam 311 is arranged flush with a front face of the terminal-side frame 20, and side faces of the pair of arm walls 312 are arranged flush with side faces of the terminal-side frame 20, respectively. In this state, the core wires of the tip ends of the three electric wires 10 held by the electric wire-side frame 30 are guided toward the through holes 221 of the three metallic terminals 220 held by the terminal-side frame 20, respectively.

As shown in FIG. 4 and FIG. 5, the transversal beam 311 of the electric wire-side frame 30 is provided with a mounting direction holding portion 320 arranged to hold a vicinity of the core wire 11 of the tip end of the electric wire 10 (hereinafter called, "tip end vicinity 12") and to guide the tip end vicinity 12 to the through hole 221 of the metallic terminal 220. The mounting direction holding portion 320 is provided one for each electric wire 10, thus total of three mounting direction holding portions 320 are provided. Each mounting direction holding portion 320 holds the tip end vicinity 12 of each electric wire 10 such that the core wire 11 of the electric wire 10 extends along the mounting direction D13 at a position where the core wire 11 of the electric wire 10 is inserted into the through hole 221 when the electric wire-side frame 30 is mounted to the terminal-side frame 20.

The mounting direction holding portion 320 is disposed at a position slightly secluded from the front face of the transversal beam 311 toward the back face side of the transversal beam 311 and is continuous with the transversal beam 311 via a circumferential face of a columnar portion of the mounting direction holding portion 320 extending along the mounting direction D13. Furthermore, three mounting direction holding portions 320 are provided such that the respective mounting direction holding portions 320 are positioned nearly just above the through holes 221 of the respective metallic terminals 220 when the electric wire-side frame 30 is mounted to the terminal-side frame 20. Each of the mounting direction holding portion 320 is provided with a press fit groove 321 on its circumferential face at a side opposite of the transversal beam 311. The press fit groove 321 is recessed toward the center such that the tip end vicinity 12 of the electric wire 10 is press fitted into the press fit groove 321. With the tip end vicinity 12 of the electric wire 10 press fitted into the press fit groove 321, the mounting direction holding portion 320 holds the tip end vicinity 12 of the electric wire 10 such that the tip end vicinity 12 extends along the mounting direction D13.

The electric wire-side frame 30 is further provided with a cross direction holding portion 330 configured to hold an isolated portion 13 of the electric wire 10 such that a part of the isolated portion 13 extends along a cross direction D14 crossing the mounting direction D13, the isolated portion 13 being distant from the core wire 11 more than the tip end vicinity 12 held by the mounting direction holding portion 320. The cross direction holding portion 330 includes a first holding portion 331 and a second holding portion 332 holding later-described two portions of the isolated portion 13, respectively.

As shown in FIG. 5, the isolated portion 13 has a crank-like shape and includes a first portion 131, a second portion 132 and a third portion 133. The first portion 131 is a portion which is bent at a substantially right angle from the tip end vicinity 12 and extending along the cross direction D14. The second portion 132 is a portion which is bent at a substantially right angle from the first portion 131 and extending along the mounting direction D13. The third portion 133 is a portion which is bent at a substantially right angle from the second portion 132 and extending along the cross direction D14.

The first holding portion 331 of the cross direction holding portion 330 holds the first portion 131 of the isolated portion 13, and the second holding portion 332 of the cross direction holding portion 330 holds the third portion 133 of the isolated portion 13.

The first holding portion 331 is recessed from the front face of the transversal beam 311 toward the back face side of the transversal beam 311 so that it is a press fit groove into which the first portion 131 is press fitted. In this embodiment, the transversal beam 311 is provided with three first holding portions 331 so as to hold the first portions 131 extending from three mounting direction holding portions 320.

Meanwhile, the second holding portions 332 are provided to the electric wire-side frame 30 in a manner as shown in FIGS. 1, 4-6, as explained below.

The electric wire-side frame 30 includes three L-shaped walls 340 each having a cross wall 341 and a parallel wall 342. The cross wall 341 projects and extends, in the cross direction D14, from a wall face of the transversal beam 311 on the opposite side of the mounting direction holding portion 320. The parallel wall 342 projects and extends from the cross wall 341 in a direction parallel with the transverse beam 311. As shown in FIG. 1, the parallel wall 342 has a shape that its projecting height from the cross wall 341 is gradually increased from the front face side to the back face side. Furthermore, as shown in FIG. 1 and FIG. 6, each second holding portion 332 is provided at an edge of the parallel wall 342 of each L-shaped wall 340 on the back face side. Each of the second holding portions 332 is recessed from the edge of the parallel wall 342 on the back face side toward the front face side, so that it is a press fit groove into which the third portion 133 is press fitted.

When the electric wire-side frame 30 which holds the three electric wires 10, each electric wire 10 being held at three portions, is mounted to the terminal-side frame 20 in the mounting direction D13, the core wire 11 of the tip end of each electric wire 10 is inserted into the through hole 221 of each metallic terminal 220. Then, the core wire 11 is soldered to the soldering portion which includes this through hole 221.

Figure 7:
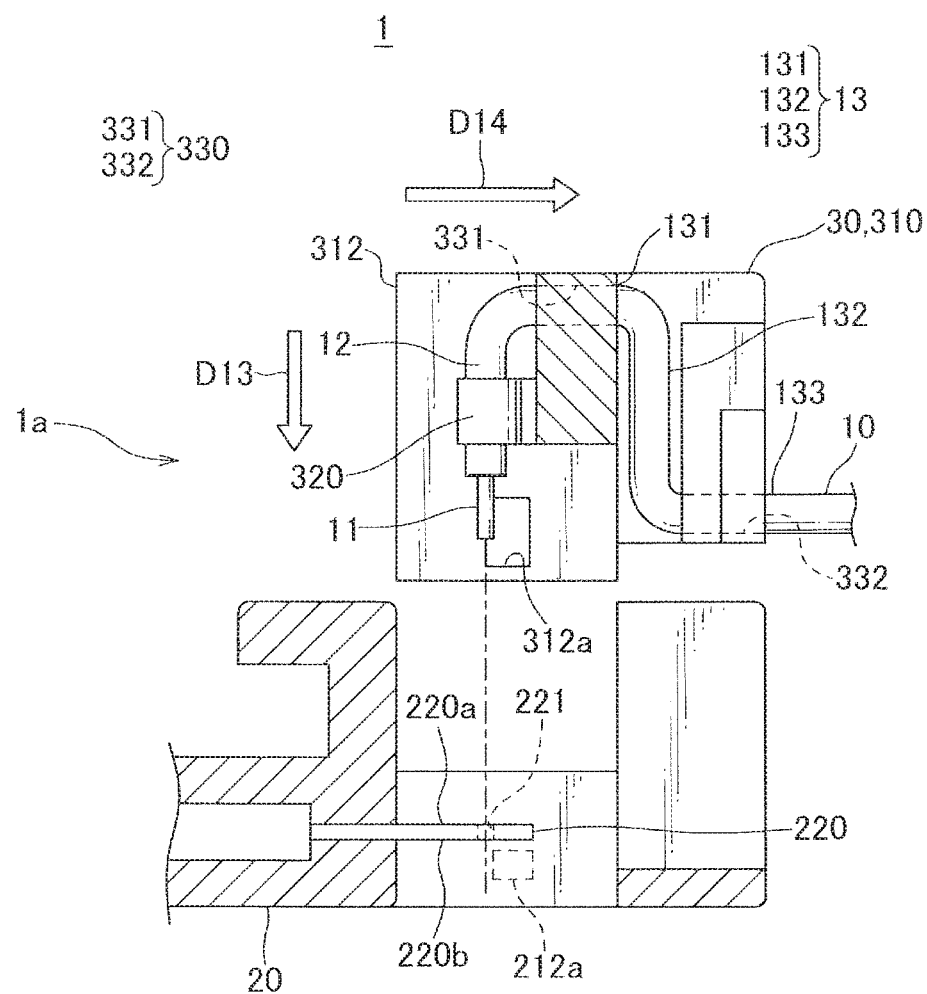
FIG. 7 is a cross sectional view showing the electric wire-side frame which is holding the electric wire being mounted to the terminal-side frame.
Figure 8:
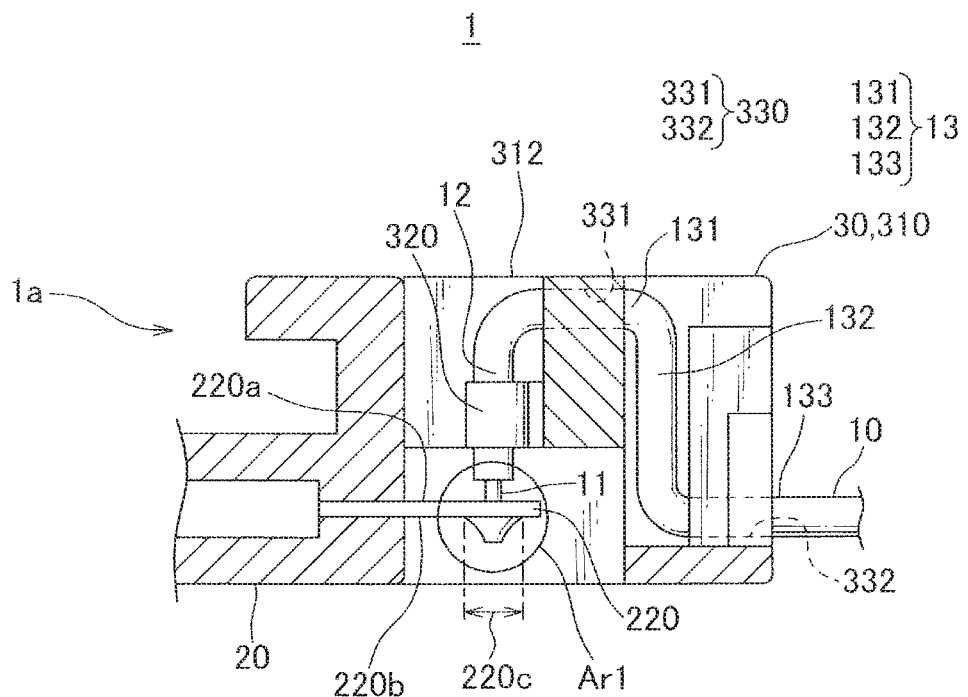
FIG. 8 is a cross sectional view showing a core wire of a tip end of the electric wire soldered to a metallic terminal after the electric wire-side frame is mounted to the terminal-side frame.

FIG. 7 is a cross sectional view showing the electric wire-side frame which is holding the electric wire being mounted to the terminal-side frame, and FIG. 8 is a cross sectional view showing the core wire of the tip end of the electric wire soldered to the metallic terminal after the electric wire-side frame is mounted to the terminal-side frame.

As explained above, for the electric wire-side frame 30, the tip end vicinity 12 of the electric wire 10 is held by the mounting direction holding portion 320 so as to extend along the mounting direction D13. Furthermore, the first portion 131 and the third portion 133 of the isolated portion 13 of the electric wire 10 are held by the first holding portion 331 and the second holding portion 332 of the cross direction holding portion 330 so as to extend along the cross direction D14.

The mounting direction D13, in which the electric wire-side frame 30 is mounted to the terminal-side frame 20, is a direction substantially orthogonal to the metallic terminal 220, as explained above. Consequently, when the electric wire-side frame 30 is mounted to the terminal-side frame 20, the core wire 11 located at a tip of the tip end vicinity 12 which is held so as to extend along the mounting direction D13 is inserted into the through hole 221 in a position substantially orthogonal to the metallic terminal 220. The insertion takes place at the same time for the three electric wires 10. Then, while the core wires 11 of the three electric wires 10 being inserted into the through holes 221 of the three metallic terminals 220, the locking claws 212a of the terminal-side frame 20 are locked to the locking holes 312a of the pair of the arm walls 312, respectively, thereby fixing the core wires 11 to the terminal-side frame 20.

As shown in FIG. 8, the core wire 11 inserted into the through hole 221 as described above is passed through the through hole 221 and projects from a back face 220b of the metallic terminal 220 which is on the opposite side of a front face 220a at the insertion side of the electric wire 10. Then, the core wire 11 is soldered, by solder supplied together with flux, to a soldering portion 220c located at an opening periphery of the through hole 221 on the back face 220b side.

Figure 9:
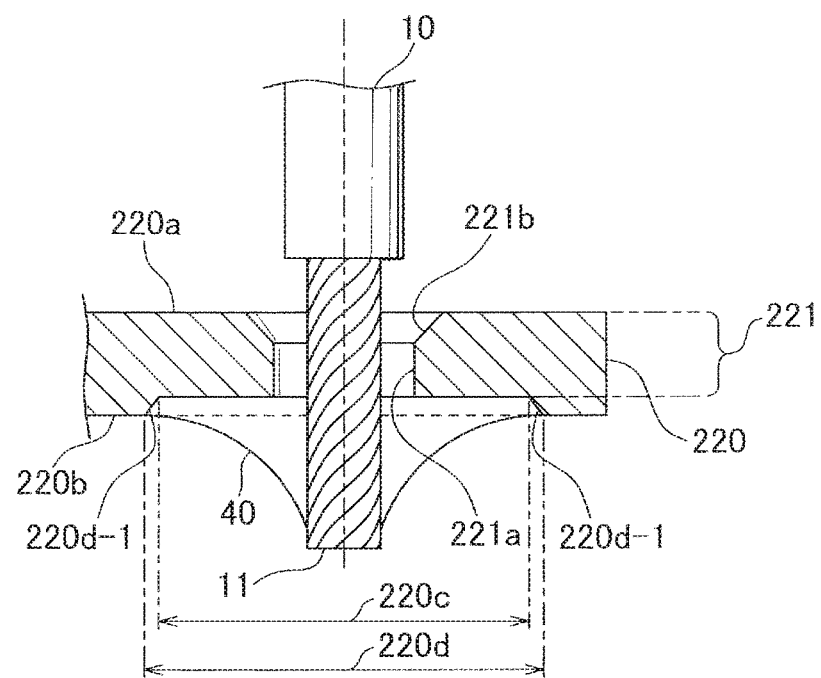
FIG. 9 is a cross sectional view taken along an area Ar1 shown in FIG. 8, illustrating the core wire of the tip end of the electric wire inserted into a through hole of the metallic terminal and soldered to an opening periphery of the through hole on a back face side of the metallic terminal.

FIG. 9 is a cross sectional view taken along an area Ar1 shown in FIG. 8, illustrating the core wire of the tip end of the electric wire inserted into the through hole of the metallic terminal and soldered to the opening periphery of the through hole on the back face side of the metallic terminal.

As shown in FIG. 9, and as shown in FIG. 2 in an enlarged view of the metallic terminal 220, the side of the through hole 221 of the metallic terminal 220 on which the insertion of the electric wire 10 takes place, is formed into a wide-mouthed shape that is widened from an inner side 221a of the through hole 221 toward an opening 221b.

Furthermore, as shown in FIG. 9, and as shown in FIG. 3 in an enlarged view of the metallic terminal 220, the opening periphery of the through hole 221 on the back face 220b of the metallic terminal 220 is formed into a recess and is the soldering portion 220c on the metallic terminal 220.

The soldering structure according to this embodiment for soldering the core wire 11 of the tip end of the electric wire 10 to the soldering portion 220c includes solder 40 which is supplied to the soldering portion 220c in a molten state together with flux, and a damming structure 220d which will be explained below. The damming structure 220d is configured to dam the solder 40 supplied in a molten state together with the flux to keep the solder 40 at the soldering portion 220c. The damming structure 220d according to this embodiment is a structure which is formed as a result of forming the soldering portion 220c into the recessed shape as described above, and which is formed by surrounding the soldering portion 220c by a wall 220d-1 that is higher than the soldering portion 220c. This damming structure 220d is formed by making the soldering portion 220c recessed than the surrounding portion by press working during the formation of the metallic terminal 220.

According to the soldering structure of this embodiment described above, the flux which is kept in the soldering portion 220c by the damming structure 220d can remove the oxide film at the soldering portion 220c with high removal efficiency. Thus, also for the stainless metallic terminal 220 to which corrosion resistance is added by a thick oxide film, the oxide film at the soldering portion 220c can be removed with high removal efficiency, thereby improving the wettability of the solder 40 in soldering. In other word, according to the soldering structure of this embodiment, the soldering of the core wire 11 of the tip end of the electric wire 10 to the soldering portion 220c can be performed with excellent workability.

Furthermore, according to the soldering structure of this embodiment, the damming structure 220d is configured such that the soldering portion 220c is surrounded by the wall 220d that is higher than the soldering portions 220c, as described above. Thus, the damming structure 220d for enabling the soldering to be performed with excellent workability can also be formed easily by press working.

Furthermore, according to the soldering structure of this embodiment, the constriction portion 223 as the narrow portion is disposed between the terminal main body 222 and the to-be-held portion 224, as shown in FIG. 2 and FIG. 3. Thus, during the soldering, the escape of heat from the terminal main body 222 to the to-be-held portion 224 can be prevented, thereby allowing the soldering to be performed with even more excellent workability.

Furthermore, according to the soldering structure on this embodiment, the narrow portion is formed between the terminal main body 222 and the to-be-held portion 224 and at the width-reduced constriction portion 223, thereby reducing the surface area of the narrow portion. Thus, the escape of heat from the constriction portion 223 itself can be prevented, thereby allowing the soldering to be performed with even more excellent workability.

Furthermore, the soldering structure according to this embodiment includes the terminal-side frame 20 and the electric wire-side frame 30 as described in reference with FIGS. 1-8, as a structure for guiding the core wire 11 of the tip end of the electric wire 10 to the soldering portion 220c prior to the above-described soldering. In this embodiment, the electric wire-side frame 30 holds the tip end vicinity 12 of the electric wire 10 such that the core wire 11 is positioned at the through hole 221 of the soldering portion 220d in the state in which the electric wire-side frame 30 is mounted to the terminal-side frame 20.

Figure 10:
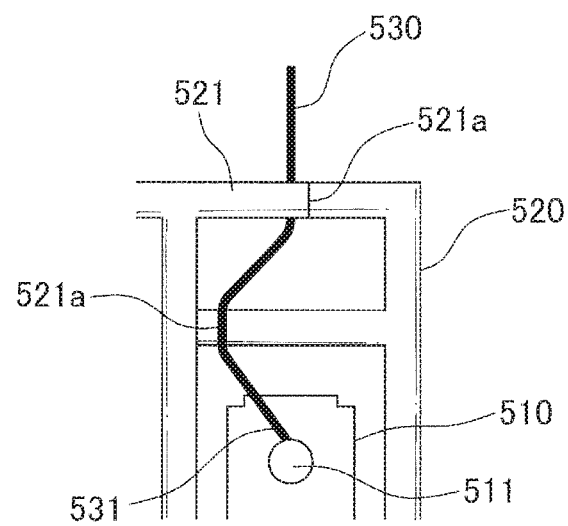
FIG. 10 shows a comparative example to be compared with a soldering portion of FIG. 9 at which the core wire of the electric wire is soldered to the metallic terminal.
Figure 11:
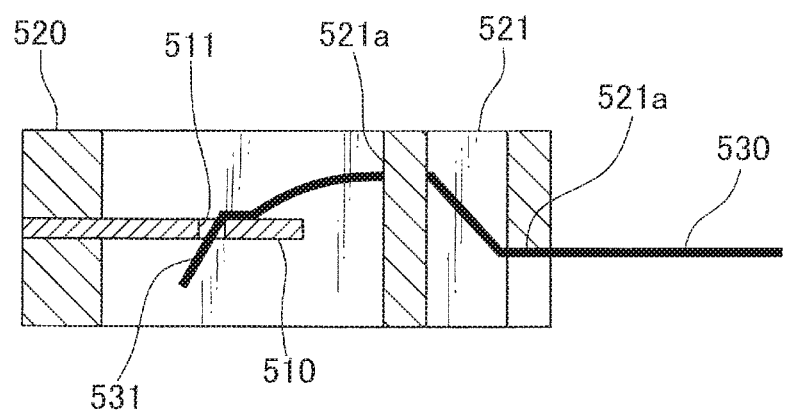
FIG. 11 is a cross sectional view of the soldering portion of the comparative example shown in FIG. 10.

FIG. 10 shows a comparative example to be compared with the soldering portion shown in FIG. 9 at which the core wire of the electric wire is soldered to the metallic terminal shown. FIG. 11 is a cross sectional view of the soldering portion of the comparative example shown in FIG. 10.

Unlike the present embodiment, the comparative example shown in FIG. 10 and FIG. 11 is not provided with a frame for holding an electric wire 530 separate from a terminal-side frame 520 which holds a metallic terminal 510. In this comparative example, a tip end 531 of the electric wire 530 is passed through the through hole 511 provided to the metallic terminal 510, and the soldering is performed with the electric wire 530 being held at two electric wire holding portions 521a provided on a circumferential wall 521 surrounding the metallic terminal 510. In this comparative example, it is necessary to perform the soldering by inserting the electric wire 530 through the through hole 511 of the metallic terminal 510 by hand, causing poor workability In contrast with this comparative example, in the soldering structure according to the present embodiment, the electric wire-side frame 30 holding the tip end vicinity 12 of the electric wire 10 is mounted to the terminal-side frame 20, thereby simultaneously positioning the core wire 11 of the electric wire 10 at the soldering portion 220c. Consequently, the core wire 11 of the electric wire 10 can be attached to the soldering portion 220c by mounting the electric wire-side frame 30 that is larger than the electric wire 10 and thus easy to handle to the terminal-side frame 20. After that when the soldering is performed, the tip end vicinity 12 of the electric wire 10 is kept held and thus the attached state is maintained, thereby efficiently preventing the coming off and such of the electric wire 10 during the soldering. Consequently, according to the soldering structure of the present embodiment, the soldering of the core wire 11 of the electric wire 10 to the soldering portion 220c at the metallic terminal 220 can be performed with excellent workability.

Furthermore, according to the soldering structure of the present embodiment, the tip end vicinity 12 of the electric wire 10 remains held after the soldering has completed. Thus, the tensile load caused when the soldered electric wire 10 is pulled is firstly received by the electric wire-side frame 30 holding the tip end vicinity 12 and the isolated portion 13 of the electrical wire 10. Consequently, the tensile load is less likely to be transferred to the connecting portion between the soldering portion 220c and the core wire 11 of the electric wire 10, preventing coming off and such of the electric wire 10 due to the tensile load.

In the soldering structure according to the present embodiment, the electric wire-side frame 30 is provide with the mounting direction holding portion 320, as shown in FIG. 7. The mounting direction holding portion 320 holds the tip end vicinity 12 of the electric wire 10 such that the tip end vicinity 12 extends along the mounting direction D13 of the electric wire-side frame 30 with respect to the terminal-side frame 20. Consequently, the core wire 11 of the electric wire 10 can be positioned at the soldering portion 220c with high accuracy at the same time with the mounting of the electric wire-side frame 30.

Furthermore, in the soldering structure according to the present embodiment, the electric wire-side frame 30 includes the cross direction holding portion 330. The cross direction holding portion 330 holds the isolated portion 13 of the electric wire 10 such that a part of the isolated portion 13 extends along the cross direction D14 crossing the mounting direction D13, the isolated portion 13 being distant from the core wire 11 more than the tip end vicinity 12. Consequently, the above-mentioned tensile load is received by the cross direction holding portion 330 which holds the isolated portion 13 that is located distant from the core wire 11 more than the tip end vicinity 12. Thus, the tensile load is further less likely to be transferred to the connecting portion formed by the soldering, further improving durability and reliability of the soldering.

Furthermore, in the soldering structure according to the present embodiment, the isolated portion 13 is arranged into the crank-like shape with the first portion 131, the second portion 132 and the third portion 133. Further, the cross direction holding portion 330 includes the first holding portion 331 holding the first portion 131 and the second holding portion 332 holding the third portion 133. For the isolated portion 13 having the crank-like shape, the above-described two portions of the isolated portion 13 are held respectively, the two portions being located so as to sandwich the second portion 132 extending along the mounting direction D13 and extending along the cross direction D14. Consequently, the above-mentioned tensile load is further less likely to be transferred to the connecting portion formed by the soldering, further improving durability and reliability of the soldering.

Furthermore, in the soldering structure according to the present embodiment, the through hole 221 is formed at the soldering portion 220c, and the core wire 11 of the electric wire 10 is soldered to the soldering portion 220c with the core wire 11 being inserted through this through hole 221. The electric wire-side frame 30 is mounted to the terminal-side frame 20 in the mounting direction D13 substantially orthogonal to the metallic terminal 220. The mounting direction holding portion 320 holds the tip end vicinity 12 of the electric wire 10 such that the tip end vicinity 12 extends along the mounting direction D13 at the position in which the core wire 11 will be inserted through the through hole 221 when the electric wire-side frame 30 is mounted to the terminal-side frame 20. Consequently, the core wire 11 of the electric wire 10 is inserted through the through hole 221 in the direction substantially orthogonal to the metallic terminal 220. The soldering takes place in this state, thus the solder will be applied evenly at the outer circumference of the core wire 11 of the electric wire 10, improving the workability of the soldering while allowing the shape of the soldering to be a well-balanced and good-looking folding-fan shape (i.e., broadened toward edge).

Furthermore, in the soldering structure according to the present embodiment, the side of the through hole 221 on which the insertion of the electric wire 10 takes place is formed into a wide-mouthed shape. Thus, the core wire 11 of the electric wire 10 can be easily inserted into the through hole 221 during the mounting of the electric wire-side frame 30. As a result, the soldering structure of the present embodiment can further improve the workability.

Furthermore, in the soldering structure according to the present embodiment, the terminal-side frame 20 holds three metallic terminals 220, and the electric wire-side frame 30 holds three electric wires 10 such that the electric wires 10 correspond one-to-one with the metallic terminals 220. Consequently, the three electric wires 10 held by the electric wire-side frame 30 are simultaneously inserted through the three metallic terminals 220 of the terminal-side frame 20 when the electric wire-side frame 30 is mounted to the terminal-side frame 20. Therefore, with the electric wires 10 being inserted through the respective metallic terminals 220, the soldering can be performed sequentially, further improving the workability.

Next, a soldering method with the soldering structure according to the present embodiment will be explained.

A soldering method according to this embodiment is a method for soldering the core wire 11 of the electric wire 10 to the soldering portion 220c of the metallic terminal 220, and the method includes a damming structure forming step, an electric wire setting step and a solder supplying step.

In the damming structure forming step, the damming structure 220d for damming the solder 40 is formed at the periphery of the soldering portion 220c to keep the solder 40, which is supplied in a molten state with the flux to the soldering portion 220c, at the soldering portion 220c. As shown in FIG. 9, in this embodiment, the damming structure 220d is a structure formed by surrounding the soldering portion 220c by the wall 220d-1 that is higher than the soldering portion 220c. In the damming structure forming step according to this embodiment, this damming structure 220d is formed by making the soldering portion 220c recessed then the surrounding portion by press working during the formation of the metallic terminal 220. This damming structure forming step is performed during the manufacture of the metallic terminal 220.

The damming structure forming step according to this embodiment may include a step of creating a damming structure 620d at the periphery of the soldering portion 220c by processing the metallic terminal 220.

The damming structure forming step and the damming structure formed thereby are not limited to the damming structure forming step and the damming structure 220d according to this embodiment, and they may be configured according to another exemplary embodiment described below.

Figure 12:
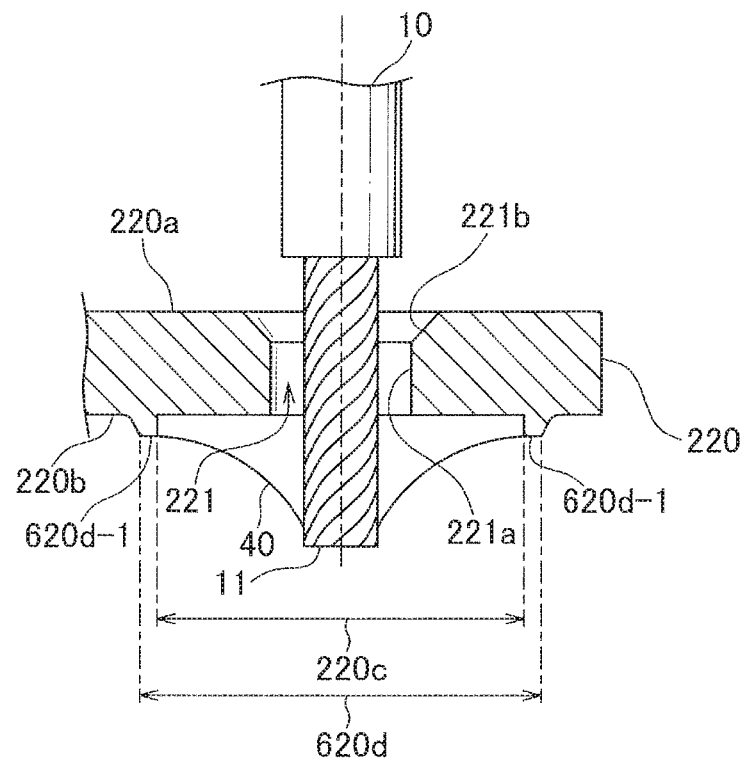
FIG. 12 illustrates a damming structure forming step and a damming structure according to a first alternative example.

FIG. 12 illustrates a damming structure forming step and a damming structure according to a first alternative example. FIG. 12 shows the cross-sectional view that is similar to that of FIG. 9. In FIG. 12, the elements similar to those shown in FIG. 9 are denoted by the same reference signs used in FIG. 9, and thus the explanation for those elements are omitted in the following.

Similar to the damming structure 220d of FIG. 9, the damming structure 620d according to the first alternative example is a structure formed by surrounding the soldering portion 220c by a wall 620d-1 that is higher than the soldering portion 220c. However, in the damming structure 620d according to the first alternative example, this wall 620d-1 is a rib-shaped wall projecting from the back face 220b of the metallic terminal 220 so as to surround the outer periphery of the soldering portion 220c. The damming structure forming step for forming this damming structure 620d according to the first alternative example includes forming the wall 620d-1 by making a portion of the metallic terminal surrounding the outer periphery of the soldering portion 220c protruded by press working. The damming structure forming step according to the first alternative example is also performed during the manufacture of the metallic terminal 220.

Similar to the damming structure forming step according to the above-described embodiment, this damming structure forming step according to the first alternative example is a step of creating the damming structure 620d at the periphery of the soldering portion 220c by processing the metallic terminal 220.

The damming structure 620d according to the first alternative example explained above also allows the flux supplied with the solder 40 in the subsequent solder supplying step to be dammed by the damming structure 620d. Consequently, the oxide film at the soldering portion 220c can be removed with high removal efficiency, thereby improving the wettability of the solder in soldering.

Figure 13:
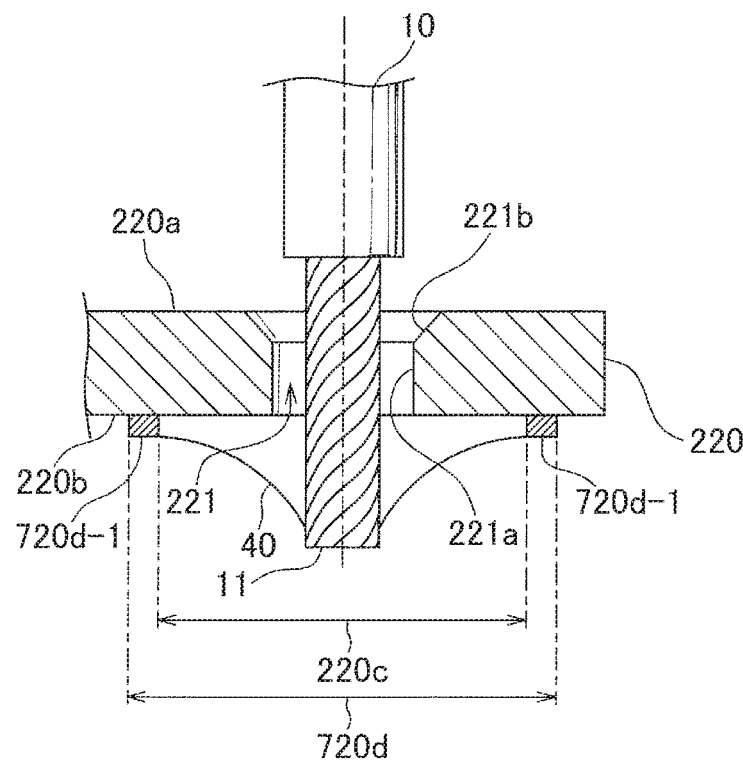
FIG. 13 illustrates a damming structure forming step and a damming structure according to a second alternative example.

FIG. 13 illustrates a damming structure forming step and a damming structure according to a second alternative example. FIG. 13 shows the cross-sectional view that is similar to that of FIG. 9. In FIG. 13, the elements similar to those shown in FIG. 9 are denoted by the same reference signs used in FIG. 9, and thus the explanation for those elements are omitted in the following.

Similar to the damming structure 220d of FIG. 9, a damming structure 720d according to the second alternative example is formed by surrounding the soldering portion 220c by a wall 720d-1 that is higher than the soldering portion 220c. However, in the damming structure 720d according to the second alternative example, this wall 720d-1 is a ring-shaped jig which is formed separately from the metallic terminal 220. The damming structure forming step for forming this damming structure 720d according to the second alternative example includes a step of disposing the wall 720d-1 as the jig at the periphery of the soldering portion 220c on the back face 220b of the metallic terminal 220. By disposing the wall 720d-1, the damming structure 720d is formed. This damming structure forming step according to the second alternative example is performed during the soldering.

Unlike the damming structure forming step according to the above-described embodiment and the first alternative example, this damming structure forming step according to the second alternative example includes disposing the wall jig surrounding the soldering portion 220c for creating the damming structure 720d.

The damming structure 720d according to the second alternative example explained above also allows the flux supplied with the solder 40 in the subsequent solder supplying step to be dammed by the damming structure 720d. Consequently, the oxide film at the soldering portion 220c can be removed with high removal efficiency, thereby improving the wettability of the solder in soldering. Further, this damming structure according to the second alternative example is provided with the oxide film with higher thickness than the metallic terminal 220 and is formed of the material with relatively low affinity for the solder 40, and is stripped after the soldering and removed from the back face 220d of the metallic terminal 220.

The explanation of the damming structure forming step and the damming structure according to the alternative examples is finished now, and in the following, the soldering method according to the present embodiment will be explained further in reference to FIG. 1 through FIG. 9.

In the present embodiment, the damming structure forming step is performed during the manufacture of the metallic terminal 220, and then during the subsequent soldering the electric wire set step and the solder supplying step are performed. The electric wire set step includes a step of setting the core wire 11 of the electric wire 10 to the soldering portion 220c in a condition ready for soldering. Specifically, it is a step of mounting the electric wire-side frame 30 holding the three electric wires 10 to the terminal-side frame 20, as described above. Consequently, the core wires 11 of the respective electric wires 10 are inserted into the through hole 221 of the soldering portion 220c. The solder supplying step includes a step of supplying the solder 40 in a molten state with the flux to the soldering portion 220c to perform soldering. With this step, the soldering is performed while removing the oxide film at the soldering portion 220c by the flux.

In the soldering methods according to the present embodiment and the two alternative examples, the flux supplied with the soldering 40 is kept within the soldering portion 220c during the soldering by the damming structure 220d, 620d, 720d formed at the periphery of the soldering portion 220c. Since the flux serves to remove the oxide film on the metal surface, by keeping the flux at the soldering portion 220c as described above, the oxide film on the soldering portion 220c can be removed with high removal efficiency. Consequently, even if the metallic terminal 220 is a stainless metallic terminal with thick oxide film to add the corrosion resistance, the oxide film at the soldering portion 220c can be removed by the flux with high removal efficiency, thereby improving the wettability of the solder during the soldering. That is, according to the soldering methods described above, the soldering of the core wires 11 of the electric wires 10 to the soldering portion 220c of the metallic terminal 220 can be performed with excellent workability.

According to the soldering method of the present embodiment and the first alternative example, the damming structure forming step includes creating the damming structure 220d, 620d at the periphery of the soldering portion 220c by processing the metallic terminal 220. Thus, the solder supplied in a molten state with the flux can be stably kept at the soldering portion 220c, allowing the soldering to be performed with even more excellent workability.

Furthermore, according to the soldering method of the present embodiment and the first alternative example, the damming structure forming step includes forming the damming structure 220d, 620d which is the structure formed by surrounding the soldering portion 220c by the wall 220d-1, 620d-1 that is higher than the soldering portion 220c. "The structure formed by surrounding the soldering portion by the wall that is higher than the soldering portion" used herein can be formed easily, for example by making the soldering portion 220c recessed then the surrounding portion or by making the periphery of the soldering portion 220c protruded in a wall shape by press working. Thus, according to the above-described soldering method, the soldering can be performed with even more excellent workability.

Furthermore, according to the soldering method of the second alternative example, the damming structure forming step includes disposing the wall jig surrounding the soldering portion 220c which constitutes the damming structure 720d. According to this second alternative example, the damming structure 720 can be formed easily with only requiring the wall jig prepared, thus the soldering can be performed with even more excellent workability.

The present embodiment and the two alternative examples described above are only representatives of the present invention, and the present invention is not limited to these. That is, various changes and modifications can be made without departing from the frame of the present invention. As long as the changed or modified ones include the features of the soldering method or the soldering structure of the present invention, they are within the scope of the present invention.

For example, in the present embodiment and the two alternative examples, the device main body 1a of the sensor device 1 of the fluid level sensor is shown as one example of the electric devices applied with the soldering structure. However, the electric device described herein is not limited to this and may be in any form as long as it includes the soldering structure for soldering the tip end of the electric wire to the soldering portion of the metallic terminal.

Furthermore, in the present embodiment and the two alternative examples, the terminal-side frame 20 arranged to hold the three metallic terminals 220 is shown as one example of the terminal-side frame, and the electric wire-side frame 30 having the three mounting direction holding portions 320 is shown as one example of the electric wire-side frame. However, the terminal-side frame and the electric wire-side frame are not limited to these, and the metallic terminal and the mounting direction holding portion for the respective frames may be provided in any number, as long as they correspond one-to-one with each other. However, as described with respect to the present embodiment, the workability in the soldering can be improved by configuring the terminal-side frame to hold the plurality of metallic terminals and configuring the electric wire-side frame to hold the plurality of mounting direction holding portions.

Furthermore, in the present embodiment and the two alternative examples, the stainless metallic terminal 220 is shown as one example of the metallic terminal covered with the corrosion resistant oxide film. However, the metallic terminal is not limited to this, and may be made of other materials.

Furthermore, in the present embodiment and the two alternative examples, the constriction portion 223 formed into the width-reduced constricted shape is shown as one example of the narrow portion. However, the narrow portion is not limited to this and may be formed into a thickness-reduced shape as long as its cross-sectional area orthogonal to its extending direction from the terminal main body is small.

Furthermore, in the present embodiment and the two alternative examples, the soldering portion 220c having the through hole 221 to which the core wire 11 of the tip end of the electric wire 10 is inserted and soldered is shown as one example of the soldering portion. In this example, the electric wire-side frame 30 is mounted to the terminal-side frame 20 in the mounting direction D13 substantially orthogonal to the metallic terminal 220. However, the soldering portion is not limited to that formed with the through hole as described above. For example, the soldering portion may be provided to a flat surface of the metallic terminal without the through hole, such that the core wire of the tip end of the electric wire is disposed along this flat surface. In this case, the electric wire-side frame holding the electric wire may be configured to be mounted to the terminal-side frame in a mounting direction substantially parallel to the flat surface of the metallic terminal. Also, in this case, the core wire of the tip end of the electric wire is positioned at the soldering portion by sliding the core wire in substantially parallel with the flat surface and disposing on the flat surface.

LIST OF REFERENCE SIGNS 1 sensor device
10 electric wire
11 core wire (tip end)
12 tip end vicinity
13 isolated portion
20 terminal-side frame
30 electric wire-side frame
40 solder
131 first portion
132 second portion
133 third portion
210 frame main body
220 metallic terminal
220a front face
220b back face
220c, 620c, 720c soldering portion
220d, 620d, 720d damming structure
220d-1, 620d-1, 720d-1 wall
221 through hole
221a inner side 221b opening
222 terminal main body
223 constriction portion
224 to-be-held portion
310 frame main body
311 transversal beam
312 arm wall
320 mounting direction holding portion
321 press fit groove
330 cross direction holding portion
331 first holding portion
332 second holding portion
340 L-shaped wall
341 cross wall
342 parallel wall
D11 long side direction
D12 short side direction
D13 mounting direction
D14 cross direction

What is claimed is:

1. A soldering method for soldering a tip end of an electric wire to a soldering portion of a planar metallic terminal having a thickness, the method comprising:
a damming structure forming step forming a damming structure at a periphery of the soldering portion to dam a solder which is to be supplied in a molten state together with a flux to the soldering portion to keep the solder at the soldering portion, wherein the damming structure is formed as a receptacle portion having a flat bottom surface, wherein a depth of the damming structure is smaller than the thickness of the planar metallic terminal;
an electric wire setting step setting the tip end of the electric wire at the soldering portion ready for soldering; and
a solder supplying step supplying the solder in the molten state together with the flux to the soldering portion to perform the soldering.

2. The method according to claim 1, wherein the damming structure forming step includes creating the damming structure, by pressing the metallic terminal, wherein the pressing causes the soldering portion to be recessed in comparison with the periphery or a circumferential edge of the soldering portion to be elevated in a bank shape.

3. The method according to claim 2, wherein the damming structure forming step includes forming, as the damming structure, a structure in which the soldering portion is surrounded by a wall that is higher than the soldering portion.

4. The method according to claim 1, wherein the damming structure forming step includes disposing a ring-shaped wall jig surrounding the soldering portion as the damming structure, wherein the wall jig has a smaller thickness than the thickness of the metallic terminal.

5. A soldering structure for soldering a tip end of an electric wire to a soldering portion of a planar metallic terminal having a thickness, comprising:
a solder to be supplied in a molten state together with a flux to the soldering portion; and
a damming structure formed at a periphery of the soldering portion and configured to dam the solder supplied in the molten state together with the flux to the soldering portion to keep the solder at the soldering portion, wherein the damming structure is formed as a receptacle portion having a flat bottom surface, wherein a depth of the damming structure is smaller than the thickness of the metallic terminal.

6. The soldering structure according to claim 5, wherein the damming structure is a structure in which the soldering portion is surrounded by a wall that is higher than the soldering portion, wherein the wall is configured as an inner circumferential surface of a recess which is formed by recessing the soldering portion in comparison with the periphery, or as an inner circumferential surface of a bank-shaped elevation which is formed by elevating a circumferential edge of the soldering portion, or as an inner circumferential surface of a ring-shaped wall jig with a smaller thickness than the metallic terminal which is disposed surrounding the soldering portion.

7. The soldering structure according to claim 5, wherein the metallic terminal includes:
a terminal main body including the soldering portion;
a narrow portion extending in an extending direction from the terminal main body and having an area of a cross-section orthogonal to the extending direction smaller than an area of a cross-section of the terminal main body orthogonal to the extending direction; and
a to-be-held portion further extending from the narrow portion and configured to be held by a designated holding structure.

8. The soldering structure according to claim 6, wherein the metallic terminal includes:
a terminal main body including the soldering portion;
a narrow portion extending in an extending direction from the terminal main body and having an area of a cross-section orthogonal to the extending direction smaller than an area of a cross-section of the terminal main body orthogonal to the extending direction; and
a to-be-held portion further extending from the narrow portion and configured to be held by a designated holding structure.

9. The soldering structure according to claim 7, wherein the narrow portion is a constricted portion extending in a planar manner from the terminal main body, and wherein a dimension of the constricted portion in a width direction of the constricted portion is smaller than a dimension of the terminal main body in the width direction.

10. The soldering structure according to claim 8, wherein the narrow portion is a constricted portion extending in a planar manner from the terminal main body, and wherein a dimension of the constricted portion in a width direction of the constricted portion is smaller than a dimension of the terminal main body in the width direction.

11. A soldering method for soldering a tip end of an electric wire to a soldering portion of a stainless metallic terminal covered with an oxide film, the method comprising:
a damming structure forming step forming a damming structure at a periphery of the soldering portion to dam a flux and a solder which is supplied in a molten state together with the flux to the soldering portion to keep the solder and the flux at the soldering portion;
an electric wire setting step setting the tip end of the electric wire at the soldering portion ready for soldering; and
a solder supplying step supplying the solder in the molten state together with the flux to the soldering portion so that the oxide film at the soldering portion is removed by the flux kept in the soldering portion to perform the soldering.

* * * * *